US009902449B2

(12) United States Patent
MacArthur et al.

(10) Patent No.: US 9,902,449 B2
(45) Date of Patent: Feb. 27, 2018

(54) DOOR GARNISH MOUNTING DEVICE (71) Applicant: HONDA MOTOR CO., LTD., Tokyo (JP)

(72) Inventors: Benjamin MacArthur, Ontario (CA); Paul Webb, Ontario (CA); Dwayne Switzer, Ontario (CA); Brent Martignago, Ontario (CA); David Van Leeuwen, Ontario (CA); Mark Daryl Franks, Ontario (CA); Darrell Lindsay Hastings, Ontario (CA)

(73) Assignee: Honda Motor Co., Ltd., Tokyo (JP)

( * ) Notice: Subject to any disclaimer, the term of this patent is extended or adjusted under 35 U.S.C. 154(b) by 327 days.

(21) Appl. No.: 14/691,271

(22) Filed: Apr. 20, 2015

(65) Prior Publication Data
US 2016/0304144 A1   Oct. 20, 2016

(51) Int. Cl.
*B21D 39/02* (2006.01)
*B62D 65/14* (2006.01)
*B62D 65/06* (2006.01)
*B23P 19/04* (2006.01)
*B60R 13/04* (2006.01)

(52) U.S. Cl.
CPC .......... *B62D 65/14* (2013.01); *B21D 39/023* (2013.01); *B60R 13/043* (2013.01); *B62D 65/06* (2013.01); *B23P 19/047* (2013.01); *B23P 2700/08* (2013.01); *B60R 13/04* (2013.01); *B65H 2801/51* (2013.01); *Y10T 29/53061* (2015.01); *Y10T 29/53909* (2015.01); *Y10T 29/54* (2015.01)

(58) Field of Classification Search
CPC .............. B65H 37/005; B65H 2801/51; Y10T 156/1788; Y10T 156/18; Y10T 29/53657; Y10T 29/54; Y10T 29/53909; Y10T 29/53039; Y10T 29/53052; Y10T 29/53061; B62D 65/16; B62D 65/06; B21D 19/04; B21D 39/06; B21D 39/023; B21D 19/047; B21D 2700/08; B60R 13/04; B60R 13/043; B23P 19/047; B23P 2700/08
See application file for complete search history.

(56) References Cited

U.S. PATENT DOCUMENTS

| | | | |
|---|---|---|---|
| 4,760,636 | A | 8/1988 | St Angelo, Jr. et al. |
| 5,820,725 | A | 10/1998 | Maeda et al. |
| 6,152,203 | A | 11/2000 | Maeda |
| 6,447,638 | B1 | 9/2002 | Maeda |
| 6,508,287 | B1 | 1/2003 | Shinozaki |
| 6,585,023 | B2 | 7/2003 | Azuhata |
| 6,601,630 | B2 | 8/2003 | Kang |

(Continued)

*Primary Examiner* — Jermie Cozart
(74) *Attorney, Agent, or Firm* — Armstrong Teasdale LLP (57) ABSTRACT A door garnish mounting device for a mounting a door garnish to a door of a vehicle includes a frame, door alignment arms extending from the frame, and a garnish applicator mounted to the frame. The door alignment arms having datum points configured to engage corresponding vehicle datum points of the vehicle proximate to a mounting location of the door garnish to the vehicle to align the frame with the door of the vehicle. The garnish applicator includes a pressing device configured to engage and press against the door garnish, a first actuator configured to press the pressing device against the door garnish, and a second actuator configured to move the pressing device along the door garnish.

17 Claims, 5 Drawing Sheets

(56) References Cited

U.S. PATENT DOCUMENTS

| | | | |
|---|---|---|---|
| 6,698,489 B1 | 3/2004 | Shinozaki et al. | |
| 6,748,993 B1 | 6/2004 | Shinozaki et al. | |
| 6,796,351 B1 | 9/2004 | Maeda | |
| 7,152,651 B2 | 12/2006 | Fujiwara | |
| 7,234,499 B2 | 6/2007 | Fujino | |
| 7,287,567 B2 | 10/2007 | Fujiwara | |
| 7,299,845 B2 | 11/2007 | Morimoto et al. | |
| 7,506,678 B2 | 3/2009 | Degawa et al. | |
| 7,748,094 B2 | 7/2010 | Yamamoto et al. | |
| 8,002,009 B2 | 8/2011 | Anderson | |
| 8,187,409 B2 | 5/2012 | Anderson | |
| 8,336,184 B2 | 12/2012 | Yamamoto et al. | |
| 2001/0013163 A1* | 8/2001 | Menguc | B23P 19/047 29/235 |
| 2008/0000588 A1 | 1/2008 | Nakagawa et al. | |

* cited by examiner

DOOR GARNISH MOUNTING DEVICE

BACKGROUND

The present disclosure relates generally to door garnish mounting devices for vehicles.

During manufacture and assembly of a vehicle, door garnishes are assembled and applied to doors of the vehicle. The door garnishes are adhered to the exterior surface of the door, such as the door sash, adjacent to the B-pillar of the vehicle body using adhesive, such as double sided tape. An installer removes the backing tape and manually adheres the door garnish to the door sash by applying pressure using a hand roller. However, due to variation in the pressure applied by the installer, the door garnish may not remain properly adhered to the door, which may potentially lead to a visual defect and increased wind noise in the vehicle cabin.

A need remains for a method and device of reliably and consistently applying door garnishes during vehicle assembly.

BRIEF DESCRIPTION

In one embodiment, a door garnish mounting device is provided for a mounting a door garnish to a door of a vehicle. The door garnish mounting device includes a frame, door alignment arms extending from the frame, and a garnish applicator mounted to the frame. The door alignment arms having datum points configured to engage corresponding vehicle datum points of the vehicle proximate to a mounting location of the door garnish to the vehicle to align the frame with the door of the vehicle. The garnish applicator includes a pressing device configured to engage and press against the door garnish, a first actuator configured to press the pressing device against the door garnish, and a second actuator configured to move the pressing device along the door garnish.

In another embodiment, a door garnish mounting device for a mounting a door garnish to a door of a vehicle is provided including a frame having a handle configured to be held by an operator and an input device configured to be actuated by the operator to operate the door garnish mounting device. Door alignment arms extend from the frame. The door alignment arms have datum points configured to engage corresponding points of the vehicle proximate to a mounting location of the door garnish to the vehicle to align the frame with the door of the vehicle. The door alignment arms are configured to be positioned by the operator manipulating the handle. A garnish applicator is mounted to the frame. The garnish applicator includes a pressing device configured to engage and press against the door garnish. The garnish applicator includes a first pneumatic actuator configured to move the pressing device in a first direction generally toward the door garnish. The garnish applicator includes a second pneumatic actuator configured to move the pressing device in a second direction transverse to the first direction. At least one of the first and second pneumatic actuators are actuated when the input device is actuated by the operator.

In a further embodiment, a method of attaching a door garnish to a door sash of a door of a vehicle is provided that uses a door garnish mounting device having a frame with door alignment arms extending therefrom and a garnish applicator mounted to the frame. The method includes positioning datum points of the door alignment arms in alignment with door datum points of the door, securing the door alignment arms to the door, and operating the garnish applicator by pressing a pressing device against the door garnish and moving the pressing device along the door garnish while maintaining generally constant pressure of the pressing device against the door garnish.

DETAILED DESCRIPTION

Various embodiments will be better understood when read in conjunction with the appended drawings. As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Various embodiments of methods and systems for mounting door garnishes onto doors of a vehicle are provided. It should be noted that although the various embodiments are described in connection with door garnishes, one or more embodiments may be implemented in different applications, such as for mounting garnishes onto other parts of the body of a vehicle. Additionally, while various embodiments are described in connection with mounting door garnishes in automotive vehicles, one or more embodiments may be implemented in different types of vehicles.

Figure 1:
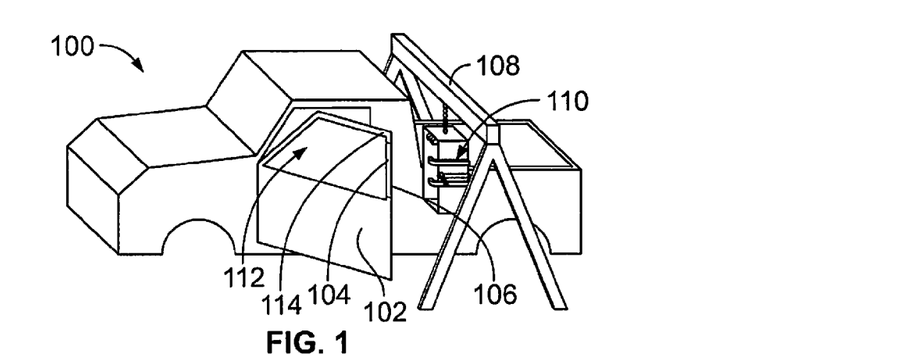
FIG. 1 is a perspective view of a vehicle in an assembly line of an automotive assembly plant having a door with a door garnish applied using a door garnish mounting device in accordance with an exemplary embodiment.

FIG. 1 is a side view of a vehicle 100 in an assembly line of an automotive assembly plant having a door 102 with a door garnish 104 applied using a door garnish mounting device 110 in accordance with an exemplary embodiment. The door garnish mounting device 110 is a machine used to repeatably and reliably apply door garnishes 104 to doors 102 of vehicles 100. The door garnish mounting device 110 applies constant pressure along the entire press stroke during application of the door garnish 104 to ensure quality application of the door garnish 104. The door garnish mounting device 110 is easily positioned relative to the door 102 and the door garnish 104 by an operator. The weight of the door garnish mounting device 110 is supported by a supporting structure, such as a support beam 108, to reduce fatigue of the operator. Other types of garnishes may be applied using similar garnish mounting devices in other locations of the vehicle 100 in alternative embodiments. The door garnish mounting device 110 may be used on various types of vehicles and vehicles having various door configurations in alternative embodiments.

The door 102 includes a door fame or sash 106 that defines a window opening 112. The door sash 106 may extend along the B-pillar of the vehicle 100. The door garnish 104 is applied to an exterior 114 of the door sash 106, and is sometimes referred to as a sash tape. During vehicle assembly or manufacture, the door garnish 104 is attached to the door sash 106 using the door garnish mounting device 110. Assembly and manufacture of the vehicle 100 is easier using the door garnish mounting device 110 to apply pressure against the door garnish 104 to press the door garnish 104 against the door sash 106. Adhesive or other substances are used to permanently affix the door garnish 104 to the door sash 106. For example, double sided foam tape may be used to attach the door garnish 104 to the door 102, or other adhesives, such as epoxy. Defects, such as from inconsistent or insufficient pressure during application, are reduced by the use of the door garnish mounting device 110 as compared to hand-rolling of the door garnish 104 by the operator.

Figure 2:
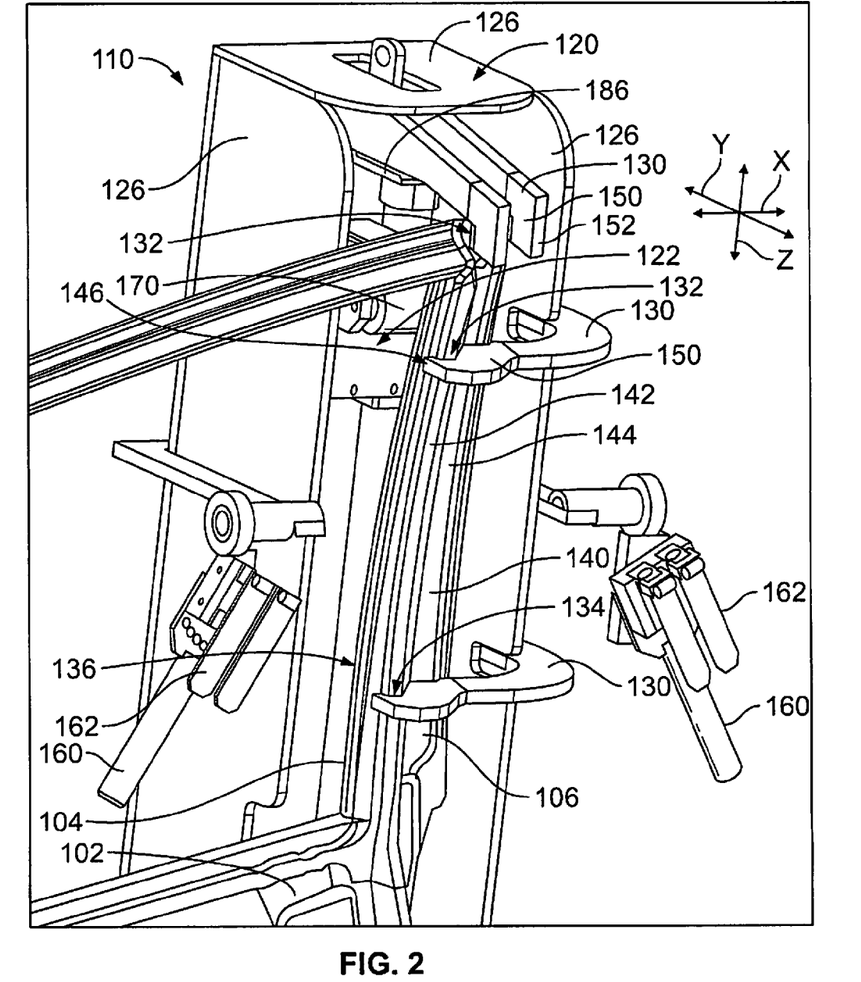
FIG. 2 is a front perspective view of the door garnish mounting device positioned on the door.
Figure 3:
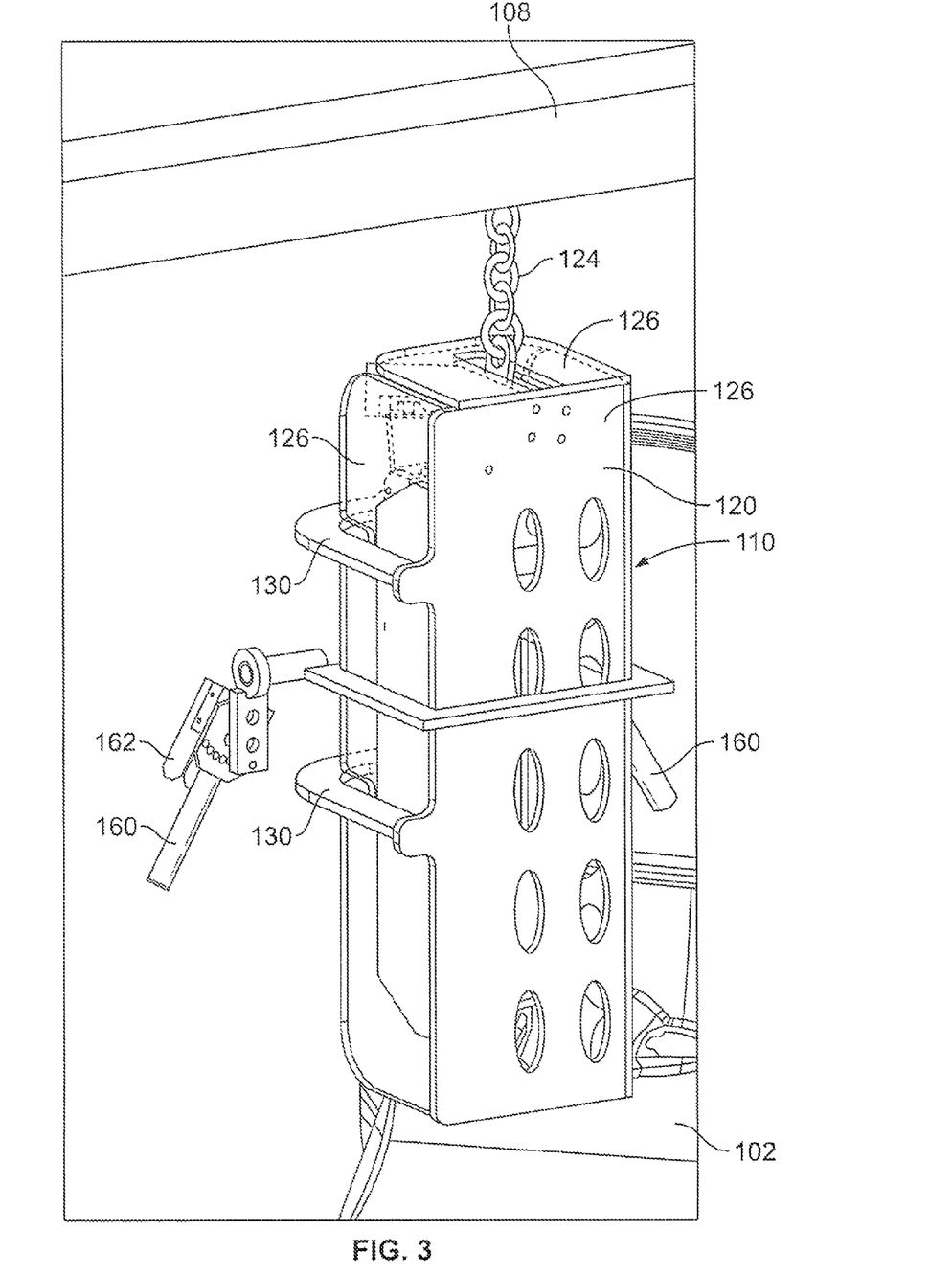
FIG. 3 is a rear perspective view of the door garnish mounting device positioned on the door.
Figure 4:
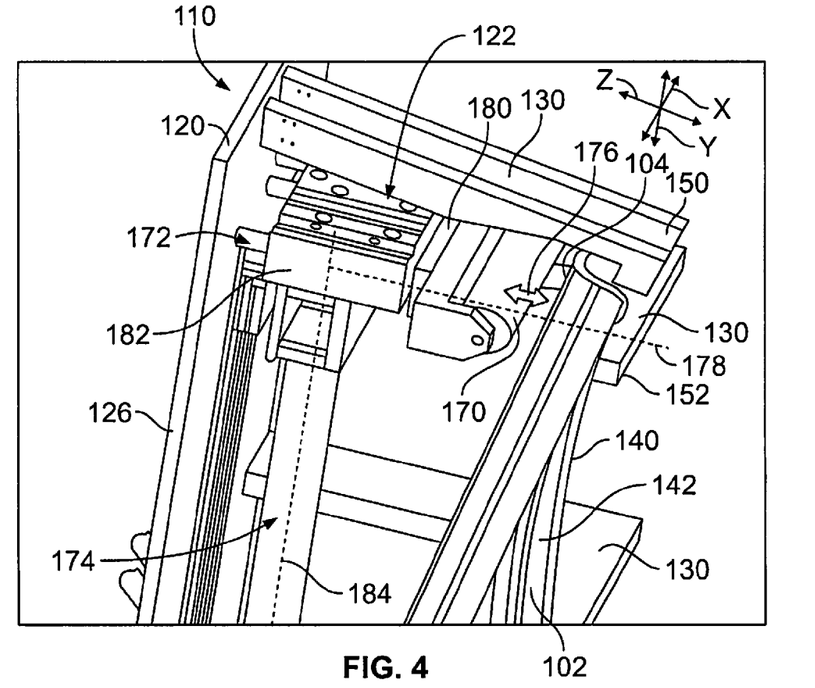
FIG. 4 is side perspective view of a portion of the door garnish mounting device positioned on the door.

FIG. 2 is a front perspective view of the door garnish mounting device 110 for applying a door garnish 104 to the door 102 in an automatic and mechanically controlled manner. The door garnish mounting device 110 is shown mounted on the door 102. FIG. 3 is a rear perspective view of the door garnish mounting device 110 positioned on the door 102. FIG. 4 is side perspective view of a portion of the door garnish mounting device 110 positioned on the door 102. The door garnish mounting device 110 is fixed to the door 102 and applies pressure against the door garnish 104 to affix the door garnish 104 to the door sash 106.

The door garnish mounting device 110 includes a frame 120 that holds a garnish applicator 122 used to apply the door garnish 104 to the door 102. Optionally, the frame 120 may include a plurality of walls 126, such as a back wall, side walls, a top wall, and the like. The walls 126 surround the garnish applicator 122. The frame 120 is supported by the support beam 108 (shown in FIG. 3). In an exemplary embodiment, the frame 120 is hung from, and supported by, the support beam 108. The frame 120 is movable relative to the support beam 108 to allow the door garnish mounting device 110 to be aligned with and coupled to the door 102 for attaching the door garnish 104 to the door 102. The door garnish mounting device 110 may then also be removed from the door 102 and moved to another door or moved out of the way, such as to allow another door of another vehicle to move into the station.

In the illustrated embodiment, the frame 120 is hung from a hanger 124 located between the frame 120 and the support beam 108. The hanger 124 may be a chain, cable, pulley, and the like that allows the door garnish mounting device 110 to be manipulated into position with respect to the door 102, while supporting the bulk of the weight of the door garnish mounting device 110. As such, the operator does not need to carry or support the door garnish mounting device 110. The hanger 124 allows the door garnish mounting device 110 to be moved into position with respect to the door 102 and moved out of the way after the door garnish 104 has been applied.

The door garnish mounting device 110 includes one or more door alignment arms 130 extending from the frame 120. The door alignment arms 130 are used to position the door garnish mounting device 110 relative to the door 102. The door alignment arms 130 have datum points 132 that are configured to engage corresponding vehicle datum points 134 on the door 102. The vehicle datum points 132 may be located proximate to a mounting location 136 for the door garnish 104 to the door 102 of the vehicle 100. The door alignment arms 130 align the frame 120 and garnish applicator 122 with the door 102 and door garnish 104. The door alignment arms 130 may engage any portions of the door 102 for locating the door garnish mounting device 110.

In the illustrated embodiment, the door alignment arms 130 engage an interior 140 of the door sash 106. For example, the door alignment arms 130 may engage a rib 142 and/or a flange 144 of the door sash 106. In an exemplary embodiment, the door alignment arms include hooks 146 that hook around and secure the door alignment arms 130 to the door sash 106 and restrict movement in one or more directions. The hooks 146 engage the door 102 and hold the relative positions of the door alignment arms 130 with respect to the door 102. The hooks 146 may define the datum points 132. The door alignment arms 130 may cup or grip features of the door 102 to accurately position and secure the door garnish mounting device 110 to the door 102. In an exemplary embodiment, the door alignment arms 130 engage the door 102 to resist movement in lateral directions and/or rotational directions. For example, the door alignment arms 130 may resist movement in x, y and/or z directions and/or rotation about the x-axis, y-axis, and/or z-axis.

In an exemplary embodiment, the door alignment arms 130 include removable inserts 150 at distal ends 152 of the door alignment arms 130. The inserts 150 define the datum points 132. The inserts 150 are removable and replaceable to change the locations of the datum points 132. For example, replacing the inserts 150 allows the door alignment arms 130 to be used to secure the door garnish mounting device 110 to different doors, such as passenger side doors versus driver side doors, front doors versus rear doors, cargo doors, rear doors and/or hatch backs versus passenger doors, or doors of different types of vehicles. Different inserts 150 may have different sized, shaped and/or positioned datum points 132, hooks 146 or other features that engage the door 102 to position the door garnish mounting device 110 to the door 102. The inserts 150 may be attached using fasteners, such as bolts, or other types of fasteners. The door garnish mounting device 110 may include different jigs or inserts to control the down stroke or up stroke of the garnish applicator 122, such as to apply longer or shorter door garnishes 104.

The door garnish mounting device 110 includes a handle 160 extending from the frame 120. The handle 160 is configured to be held by the operator, such as to manipulate the door garnish mounting device 110 into position relative to the door 102 and/or to swing the door garnish mounting device 110 away from the door 102 after the door garnish 104 is applied. Optionally, multiple handles 160 are provided, such as a left hand handle and a right hand handle. Optionally, the handles 160 may be adjustable to allow for ergonomic griping by the operator and/or adjustment for different operators. The handles 160 may be adjustable to ensure that the handles 160 do not interfere with application to different types of doors 102.

In an exemplary embodiment, the handles 160 have input devices 162 operably coupled to the garnish applicator 122 to activate operation of the garnish applicator 122. Optionally, the input devices 162 may be levers. Alternatively, the input devices may be other types of devices, such as buttons, triggers, pulls, and the like. The input devices 162 may be actuated, such as by pressing the input devices 162, to operate the garnish applicator 122. In the illustrated embodiment, both the left and right hand handles 160 have input devices 162. Having multiple input devices 162 may provide a safety feature, whereby both hands of the operator are required to be on the handles 160 to press both input devices for activation of the garnish applicator 122, which may avoid inadvertent operation of the garnish applicator 122. Optionally, the handles 160 may include multiple input devices 162 such as to control a first operation of the garnish applicator 122 and to control a second operation of the garnish applicator 122. For example, one or more input device(s) 162 may control forward pressure of the garnish applicator 122 against the door garnish 104 and other input device(s) 162 may control downward pressure of the garnish applicator 122 along the door garnish 104. One or more input device(s) 162 may control a down stroke of the garnish applicator 122 while other input device(s) 162 controls an up stroke of the garnish applicator 122.

The garnish applicator 122 is used to apply the door garnish 104 to the door 102. With particular reference to FIG. 4, the garnish applicator 122 includes a pressing device 170 that engages and presses against the door garnish 104. The pressing device 170 presses with sufficient pressure to adhere the adhesive of the door garnish 104 to the door 102. The garnish applicator 122 includes a first actuator 172 and a second actuator 174 operably coupled to the pressing device 170. The first and second actuators 172, 174 are operated to move the pressing device 170. The first actuator 172 is operated to move the pressing device 170 against the door garnish 104. The second actuator 174 is operated to move the pressing device 170 along the door garnish 104, such as from a top to a bottom (or a bottom to a top) of the door garnish 104.

In the illustrated embodiment, the pressing device 170 is a roller and may be referred to hereinafter as roller 170. The roller 170 is configured to roll along the door garnish 104 as the garnish applicator 122 is operated. For example, the roller 170 may roll from a top of the door garnish 104 to the bottom of the door garnish 104 during a pressing operation. Alternatively, the door garnish may roll along the door garnish 104 from the bottom of the door garnish 104 to the top of the door garnish 104. Optionally, the roller 170 may engage the door garnish 104 along both a downward stroke and an upward stroke during the pressing operation instead of along a single stroke. In an exemplary embodiment, the garnish applicator 122 holds the pressing device 170 against the door garnish 104 with a constant pressure as the pressing device 170 is moved along the door garnish 104. Optionally, the roller 170 may be able to swivel or rotate to ensure alignment with the door garnish 122.

In an exemplary embodiment, the first and second actuators 172, 174 are pneumatic actuators that are pneumatically controlled. Alternatively, the first and second actuators 172, 174 may be hydraulically controlled, electronically controlled or otherwise. Optionally, the first actuator 172 may be operated independently of the second actuator 174. The first actuator 172 is actuated in a first direction, which may be referred to as a pressing direction 176, along a press stroke. When the first actuator 172 is actuated in the pressing direction 176, the pressing device 170 is moved along a pressing axis 178. The pressing direction 176 may be a generally horizontal direction, such as along the z-axis. The pressing device 170 may be directly mounted to an end of the first actuator 172. During the press stroke, when the pressing device 170 is actuated in the pressing direction 176, the pressing device 170 is moved toward the door garnish 104. Optionally, the first actuator 172 may be operated until the pressing device 170 presses against the door garnish 104 at a regulated or predetermined pressure.

In an exemplary embodiment, the door garnish mounting device 110 includes a pressure sensor 180 that measures a pressure of the pressing device 170 against the door garnish 104. The pressure sensor 180 may be any type of pressure sensor, such as a load cell. The pressure sensor 180 may be applied directly to the first actuator 172, the pressing device 170, the door alignment arm(s) 130 or other locations to measure forces of the pressing device 170 on the door garnish 104. The first actuator 172 may be operated based on inputs from the pressure sensor 180. The first actuator 172 may be operated until a predetermined pressure is sensed by the pressure sensor 180.

The door garnish mounting device 110 is self-supporting and the pressing force of the pressing device 170 is counteracted by the door alignment arms 130. For example, the first actuator 172 presses the pressing device 170 against the exterior of the door 102, while the door alignment arms 130 support the interior of the door 102. The pressure exerted by the pressing device 170 is counteracted by the door alignment arms 130 pressing against the opposite side of the door 102. The door 102 does not need to be independently supported as the door garnish mounting device 110 presses against itself during application of the door garnish 104.

The second actuator 174 is connected to the pressing device 170, such as via the first actuator 172. For example, the second actuator 174 is coupled to a frame 182 that supports the first actuator 172. Alternatively, the second actuator 174 may be directly coupled to the pressing device 170. When the second actuator 174 is actuated, the first actuator 172 and corresponding pressing device 170 are moved by the second actuator 174. The second actuator 174 moves the pressing device 170 along a press stroke. For example, the second actuator 174 moves the pressing device 170 along a stroke axis 184, which is transverse to the pressing axis 178. Optionally, the second actuator 174 may move the pressing device 170 in a generally vertical direction, such as along the y-axis. For example, the second actuator 174 may pull the pressing device 170 downward (or may push the pressing device 170 downward, depending on the orientation of the second actuator 174) along the door garnish 104 during the press stroke. The door garnish mounting device 110 may include one or more position sensors 186 (shown in FIG. 2) configured to determine the position of the door garnish mounting device 110 relative to the door garnish 104, such as along any or all segments of the press cycle. For example, the position sensor 186 may determine when the pressing device 170 is at a bottom position, which may cause the garnish applicator 122 to automatically return to the home or top position, such as by releasing the first and/or second actuators 172, 174.

In an exemplary embodiment, the door garnish 104 is curved and has a non-linear contour that follows the contour of the door sash 106. During operation of the garnish applicator 122, in an exemplary embodiment, the pressing device 170 maintains a constant pressure against the door garnish 104 as the pressing device 170 moves along the door garnish 104. For example, as the second actuator 174 pulls the pressing device 170 downward along the door garnish 104, the first actuator 172 holds the pressing device 170 at a constant pressure against the door garnish 104. Optionally, because the door garnish 104 has a non-linear contour, the first actuator 172 may move the pressing device 170 inward or outward along the pressing axis 178 as the second actuator 174 moves the pressing device 170 along the stroke axis 184 (e.g., along a linear path). Having the first actuator 172 move the pressing device 170 during the press stroke allows the garnish applicator 122 to maintain a constant pressure along the full range of the contour. Optionally, the pressure sensor 180 may measure the rolling force of the pressing device 170 during the press stroke and may control movement of the first actuator 172 as the pressing device 170 is moved along the press stroke.

Figure 5:
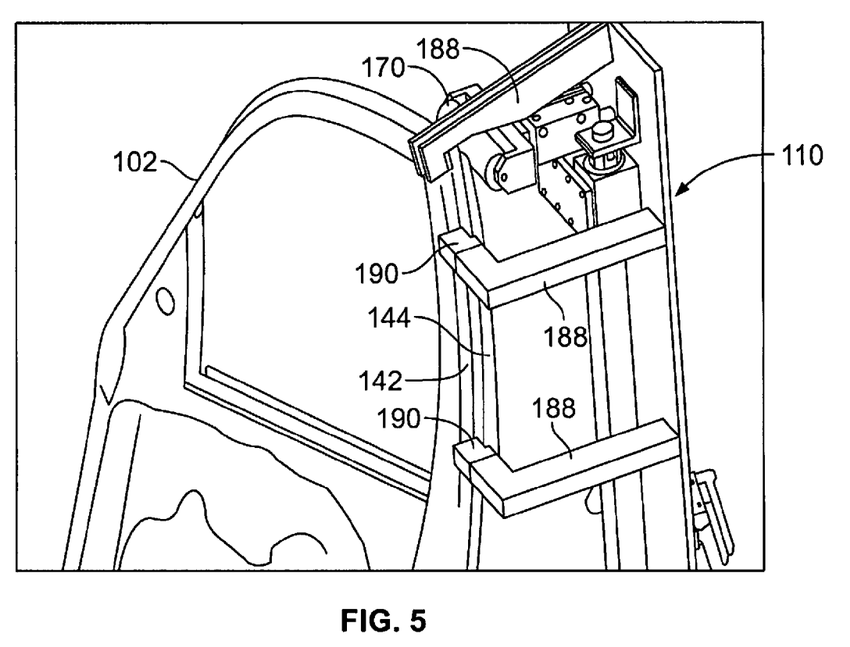
FIG. 5 illustrates the door garnish mounting device positioned on the door in a different manner.

FIG. 5 illustrates the door garnish mounting device 110 positioned on the door 102 in a different manner. The door garnish mounting device 110 includes door alignment arms 188 that are shaped differently than the door alignment arms 130 illustrated in FIG. 2. The door alignment arms 188 have different inserts 190 than the inserts 150 shown in FIG. 2. The inserts 190 engage different surfaces of the door 102. The inserts 190 abut against the rib 142 and extend along the flange 144 rather than wrapping at least partially around the rib 142. For example, rather than hooking around the rib 142, the door alignment arms 188 hook around the flange 144. Once the door garnish mounting device 110 is properly position with respect to the door 102, the door garnish mounting device 110 may be operated in a similar matter as described above.

Figure 6:
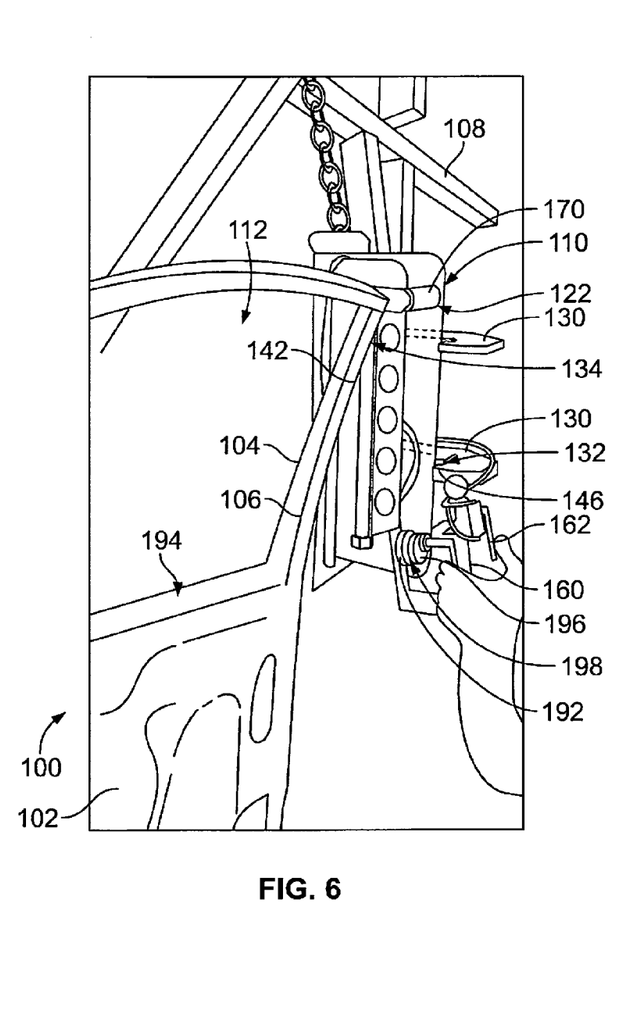
FIG. 6 illustrates the door garnish mounting device in an un-mounted position.
Figure 7:
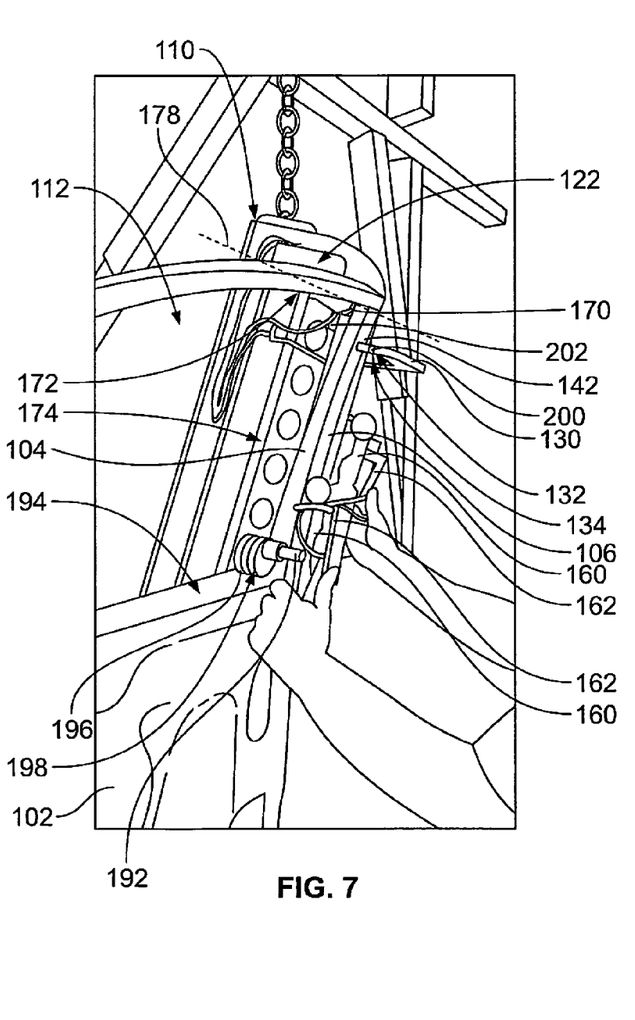
FIG. 7 illustrates a garnish applicator of the door garnish mounting device at a top stroke position.
Figure 8:
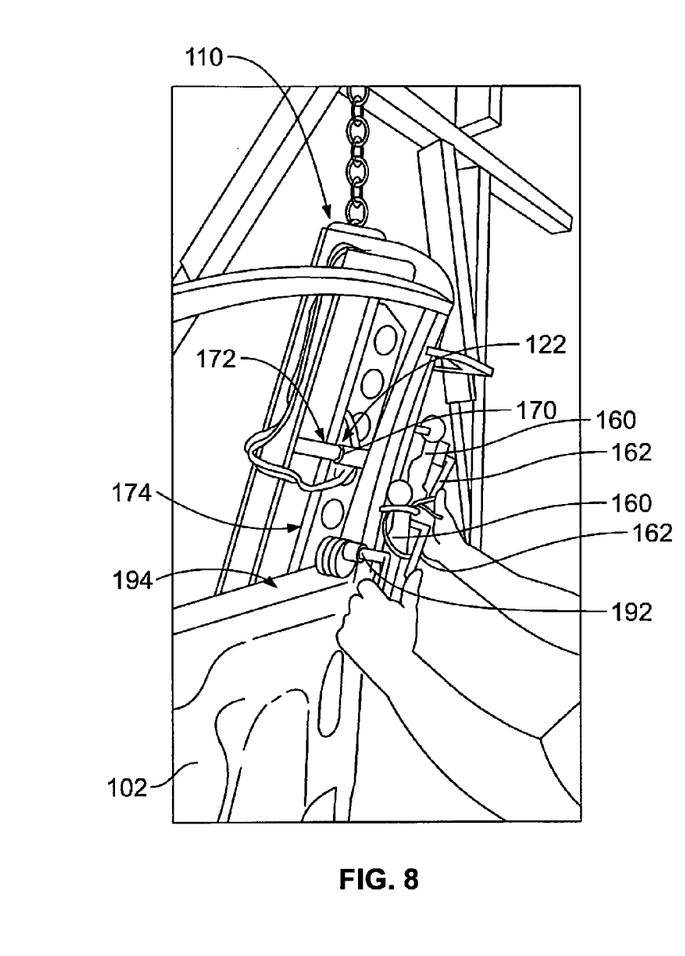
FIG. 8 illustrates the garnish applicator at an intermediate stroke position.
Figure 9:
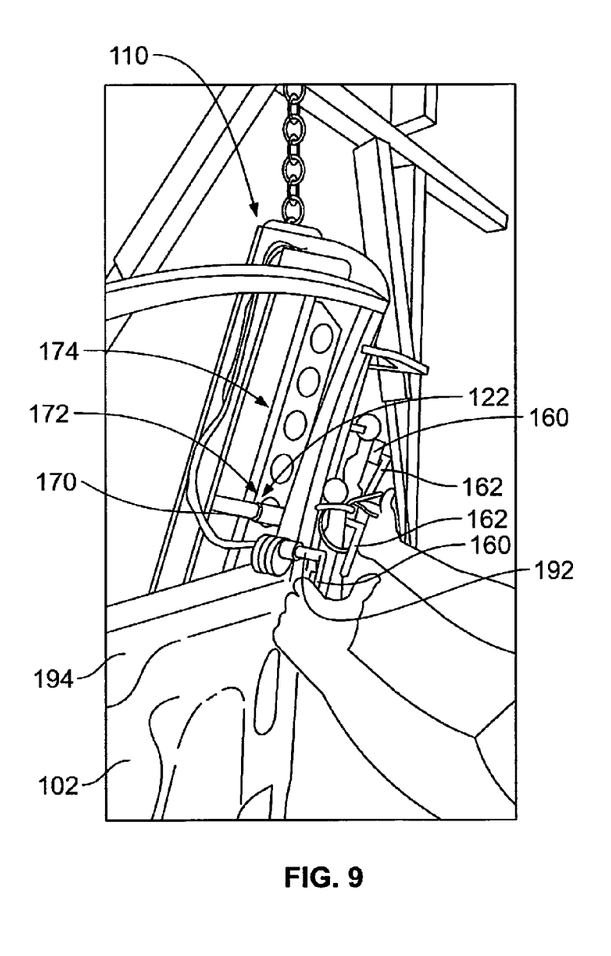
FIG. 9 illustrates the garnish applicator at a bottom stroke position.

FIGS. 6 through 9 illustrate an exemplary operation of the door garnish mounting device 110 to apply the door garnish 104 to the door 102. FIG. 6 illustrates the door garnish mounting device 110 in an un-mounted position. FIGS. 7 through 9 illustrate the door garnish mounting device 110 in a mounted position with the garnish applicator 122 at various positions along the door garnish 104. FIG. 7 illustrates the garnish applicator 122 at a top stroke position. FIG. 8 illustrates the garnish applicator 122 at an intermediate stroke position. FIG. 9 illustrates the garnish applicator 122 at a bottom stroke position.

During assembly of the vehicle 100, the vehicle 100 may be transferred to a door garnish application station along the assembly line. The door garnish mounting device 110 is hung from the support beam 108 and movable from the un-mounted position (FIG. 6) to the mounted position (FIG. 7) once the vehicle 100 is positioned in the door garnish application station. The operator may move the door garnish mounting device 110 by holding the handles 160 and manipulating or swinging the door garnish mounting device 110 into position on the door 102. Optionally, one or more of the handles 160 may extend from or include a bottom mounting arm 192 for positioning the door garnish mounting device 110 on the door 102. As the door garnish mounting device 110 is moved into position, the hooks 146 are positioned to receive the rib 142 of the door sash 106.

FIGS. 6 through 9 illustrate the door garnish mounting device 110 with a bottom mounting arm 192 that is configured to be positioned on a sill 194 of the window opening 112. The bottom mounting arm 192 includes an insert 196 having a lip 198 defining one of the datum points 132 for locating the door garnish mounting device 110 with respect to the door 102. Some of the weight of the door garnish mounting device 110 may rest on the sill 194. Once the door garnish mounting device 110 is properly positioned on the door 102, the garnish applicator 122 may be operated.

In an exemplary embodiment, the door garnish mounting device 110 includes one or more proximity sensors 200 (FIG. 7) configured to determine the location of the door garnish mounting device 110 with respect to the door 102. For example, the proximity sensors 200 may be positioned along the door alignment arms 130 to ensure that the door alignment arms 130 are properly positioned with respect to the door 102. The proximity sensors 200 may be positioned at or near the datum points 132. The proximity sensors 200 may detect locations of the vehicle datum points 134. Operation of the garnish applicator 122 may be controlled based upon the inputs from the proximity sensor 200. For example, when the proximity sensors 200 determine that the door garnish mounting device 110 is in proximity to the door 102, and thus properly positioned with respect to the door 102, the garnish applicator 122 may be operated. However, if the proximity sensors 200 do not detect proper positioning of the door garnish mounting device 110, such as when the proximity sensors 200 do not detect sufficient proximity of the door 102, the garnish applicator 122 may remain inoperable until the proximity sensors 200 detect proper positioning of the door garnish mounting device 110 with respect to the door 102. The proximity sensors 200 may be any type of proximity sensors, such as reed switches, hall sensors, and the like.

In an exemplary embodiment, the door garnish mounting device 110 includes a temperature sensor 202 (FIG. 7) configured to measure a temperature of the door garnish 104. The garnish applicator 122 may be operated based on inputs from the temperature sensor 202. For example, the garnish applicator 122 may only operate if the temperature sensor 202 senses the temperature of the door garnish 104 to be within a predetermined range. For example, the door garnish 104 may need to be above approximately 15° C. and/or below 45° C. for the adhesive on the back side of the door garnish 104 to properly adhere to the door 102. If the door garnish 104 is too hot or too cold, the temperature sensor 202 will determine such and ensure that the door garnish mounting device 110 is not operated until the door garnish 104 is at an appropriate temperature. The temperature sensor 202 may measure the temperature of other components, such as the door 102.

Once the door garnish mounting device 110 is positioned on the door 102, the garnish applicator 122 may be operated to apply the door garnish 104 to the door 102. In the illustrated embodiment, the door garnish 104 is applied from the top down (e.g., a downward stroke); however in alternative embodiments, the door garnish 104 may be applied from the bottom up (e.g., an upward stroke). In an exemplary embodiment, the operator presses the input device(s) 162 to begin operation of the garnish applicator 122. When the input device(s) 162 are pressed the first actuator 172 moves the pressing device 170 toward the door garnish 104 along the pressing axis 178. The pressure sensor 180 (shown in FIG. 4) determines the pressure of the pressing device 170 on the door garnish 104. Once an appropriate pressure is reached (e.g., 140 Newton) the second actuator 174 may be actuated to move the pressing device 170 downward along the door garnish 104. The first actuator 172 moves the pressing device 170 inward or outward as the pressing device 170 moves along the door garnish 104 to maintain a generally constant pressure.

Optionally, the input device(s) 162 may be depressed during the entire press stroke until the pressing device 170 reaches the bottom of the press stroke. At the bottom of the press stroke, the operator may release the input devices 162 which may release the first actuator 172 and/or the second actuator 174. In alternative embodiments, the operator may press different input devices 162 to release the first actuator 172 and/or the second actuator 174. When the garnish applicator 122 is released, the pressing device 170 may be returned to the top or home position. In alternative embodiments, rather than releasing the pressing device at the bottom of the press stroke, the garnish applicator 122 may complete the press cycle by running the pressing device 170 upward along the door garnish 104 for a second press stroke. After the garnish applicator 122 has applied the door garnish 104 to the door 102, the door garnish mounting device 110 may be removed from the door 102 and a new vehicle 100 moved into position in the door garnish application station.

Various embodiments describe herein provide a door garnish mounting device that is capable of attaching a door garnish to a door sash of the vehicle in a reliable and consistent manner. The door garnish mounting device applies constant pressure along the length of the door garnish. The door garnish mounting device includes safety features for the operator and operational features that reduce fatigue for the operator.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from their scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

The foregoing description of embodiments and examples has been presented for purposes of illustration and description. It is not intended to be exhaustive or limiting to the forms described. Numerous modifications are possible in light of the above teachings. Some of those modifications have been discussed and other will be understood by those skilled in the art. The embodiments were chosen and described for illustration of various embodiments. The scope is, or course, not limited to the examples or embodiments set forth herein, but can be employed in any number of applications and equivalent devices by those of ordinary skill in the art. Rather it is hereby intended the scope be defined by the claims appended hereto. Additionally, the features of various implementing embodiments may be combined to form further embodiments.

What is claimed is:

1. A door garnish mounting device for mounting a door garnish to a door of a vehicle, the door garnish mounting device comprising:
   a frame;
   door alignment arms extending from the frame, the door alignment arms having datum points configured to engage corresponding vehicle datum points of the vehicle proximate to a mounting location of the door garnish to the vehicle to align the frame with the door of the vehicle; and
   a garnish applicator mounted to the frame, the garnish applicator comprising a pressing device configured to engage and press against the door garnish, the garnish applicator having a first actuator configured to press the pressing device against the door garnish, the garnish applicator having a second actuator configured to move the pressing device along the door garnish.

2. The door garnish mounting device of claim 1, wherein the first actuator is configured to maintain a constant pressure of the pressing device against the door garnish during a press stroke of the garnish applicator.

3. The door garnish mounting device of claim 1, wherein the first actuator moves the pressing device along a pressing axis and the second actuator moves the pressing device along a stroke axis transverse to the pressing axis.

4. The door garnish mounting device of claim 3, wherein the first actuator moves the pressing device along the pressing axis as the second actuator moves the pressing device along the stroke axis to follow a non-linear contour of the door garnish and maintain a constant pressure on the door garnish.

5. The door garnish mounting device of claim 1, wherein the pressing device comprises a roller configured to roll along an exterior of the door garnish as the garnish applicator is advanced along a press stroke.

6. The door garnish mounting device of claim 1, wherein the door alignment arms are configured to engage an interior of the door of the vehicle and the pressing device is configured to press the door garnish against an exterior of the door.

7. The door garnish mounting device of claim 1, wherein the frame is hung from, and supported by, a support beam, the frame being moveable relative to the support beam to allow the door garnish mounting device to be aligned with and coupled to the door for attaching the door garnish to the door.

8. The door garnish mounting device of claim 1, wherein the door alignment arms include inserts at distal ends thereof, the inserts defining the datum points, the inserts being replaceable to change the locations of the datum points for application to different doors.

9. The door garnish mounting device of claim 1, wherein the door alignment arms include hooks configured to engage the door and hold the relative positions of the door alignment arms with respect to the door.

10. The door garnish mounting device of claim 1, further comprising a sensor operably coupled to the garnish applicator, the sensor controlling operation of the garnish applicator.

11. The door garnish mounting device of claim 10, wherein the sensor comprises a pressure sensor measuring a pressure of the pressing device against the door garnish, the garnish applicator being operated to maintain a constant pressure during a press stroke.

12. The door garnish mounting device of claim 10, wherein the sensor comprises a temperature sensor configured to measure a temperature of the door garnish, the garnish applicator only operating if the temperature sensor senses the temperature of the door garnish to be within a predetermined range.

13. The door garnish mounting device of claim 10, wherein the sensor comprises a proximity sensor configured to determine a location of the door garnish mounting device with respect to the door.

14. The door garnish mounting device of claim 1, further comprising a handle extending from the frame configured to be held by an operator and an input device operably coupled to the garnish applicator configured to be actuated by the operator to operate the garnish applicator.

15. A door garnish mounting device for mounting a door garnish to a door of a vehicle, the door garnish mounting device comprising:
- a frame having a handle configured to be held by an operator and an input device configured to be actuated by the operator to operate the door garnish mounting device;
- door alignment arms extending from the frame, the door alignment arms having datum points configured to engage corresponding points of the vehicle proximate to a mounting location of the door garnish to align the frame with the door of the vehicle, wherein the door alignment arms are configured to be positioned by the operator manipulating the handle; and
- a garnish applicator mounted to the frame, the garnish applicator comprising a pressing device configured to engage and press against the door garnish, a first actuator configured to move the pressing device in a first direction generally toward the door garnish, and a pneumatic actuator configured to move the pressing device in a second direction transverse to the first direction, wherein at least one of the first and second actuators are actuated when the input device is actuated by the operator.

16. The door garnish mounting device of claim 15, wherein the first actuator moves the pressing device along a pressing axis as the second actuator moves the pressing device along a stroke axis transverse to the pressing axis to follow a non-linear contour of the door garnish and maintain a constant pressure on the door garnish.

17. The door garnish mounting device of claim 15, wherein the door alignment arms are configured to engage an interior of the door of the vehicle and the pressing device is configured to press the door garnish against an exterior of the door.

* * * * *